United States Patent [19]

Tamaki

[11] Patent Number: 5,023,734
[45] Date of Patent: Jun. 11, 1991

[54] CYLINDRICAL ROTARY TRANSDUCER

[75] Inventor: Yoshihiro Tamaki, Kawasaki, Japan

[73] Assignee: Victor Company of Japan, Ltd., Yokohama, Japan

[21] Appl. No.: 428,995

[22] Filed: Oct. 30, 1989

[30] Foreign Application Priority Data

Oct. 31, 1988 [JP] Japan .................................. 63-142513

[51] Int. Cl.$^5$ ............................................. G11B 5/027
[52] U.S. Cl. .......................................... 360/84; 310/71; 310/184; 310/198; 310/208; 310/254; 310/261
[58] Field of Search ................. 310/261, 254, 71, 208, 310/67 R, 179, 270, 157, 180, 260, 184, 198, DIG. 6; 439/13, 27; 360/70, 77.16, 84, 85

[56] References Cited

U.S. PATENT DOCUMENTS

| | | | |
|---|---|---|---|
| 4,039,875 | 8/1977 | Morreale | 310/DIG. 6 |
| 4,446,497 | 5/1984 | Hirayama | 360/77.16 |
| 4,471,250 | 9/1984 | Snider | 310/157 |
| 4,539,604 | 9/1985 | Namiki | 360/70 |
| 4,564,876 | 1/1986 | Takahashi | 360/77.16 |
| 4,639,805 | 1/1987 | Hirota | 360/84 |
| 4,724,346 | 2/1988 | Klein | 310/71 |
| 4,737,676 | 4/1988 | Maemine | 310/71 |
| 4,779,330 | 10/1988 | Genco | 310/71 |
| 4,806,808 | 2/1989 | Grecksch | 310/71 |
| 4,882,635 | 11/1989 | Sanai | 360/77.16 |

Primary Examiner—R. Skudy
Attorney, Agent, or Firm—Fleit, Jacobson, Cohn, Price, Holman & Stern

[57] ABSTRACT

In a cylindrical rotary transducer having a stator core cylindrically formed from a high permeability material, a rotary core disposed coaxially with the stator core and cylindrically formed from a high permeability material, and a stator coil and rotor coil disposed respectively on the stator core and the rotary core so as to confront each other; the cylindrical rotary transducer comprises a disk-shaped terminal member mounted on one of the stator and rotary cores, having a plurality of projections radially formed on an outer peripheral edge thereof, and terminals connectd to one of the stator and rotor coils being fastened to the projections; and a supporting element for supporting one of the stator and rotary cores from the other in a rotatable relationship.

6 Claims, 3 Drawing Sheets

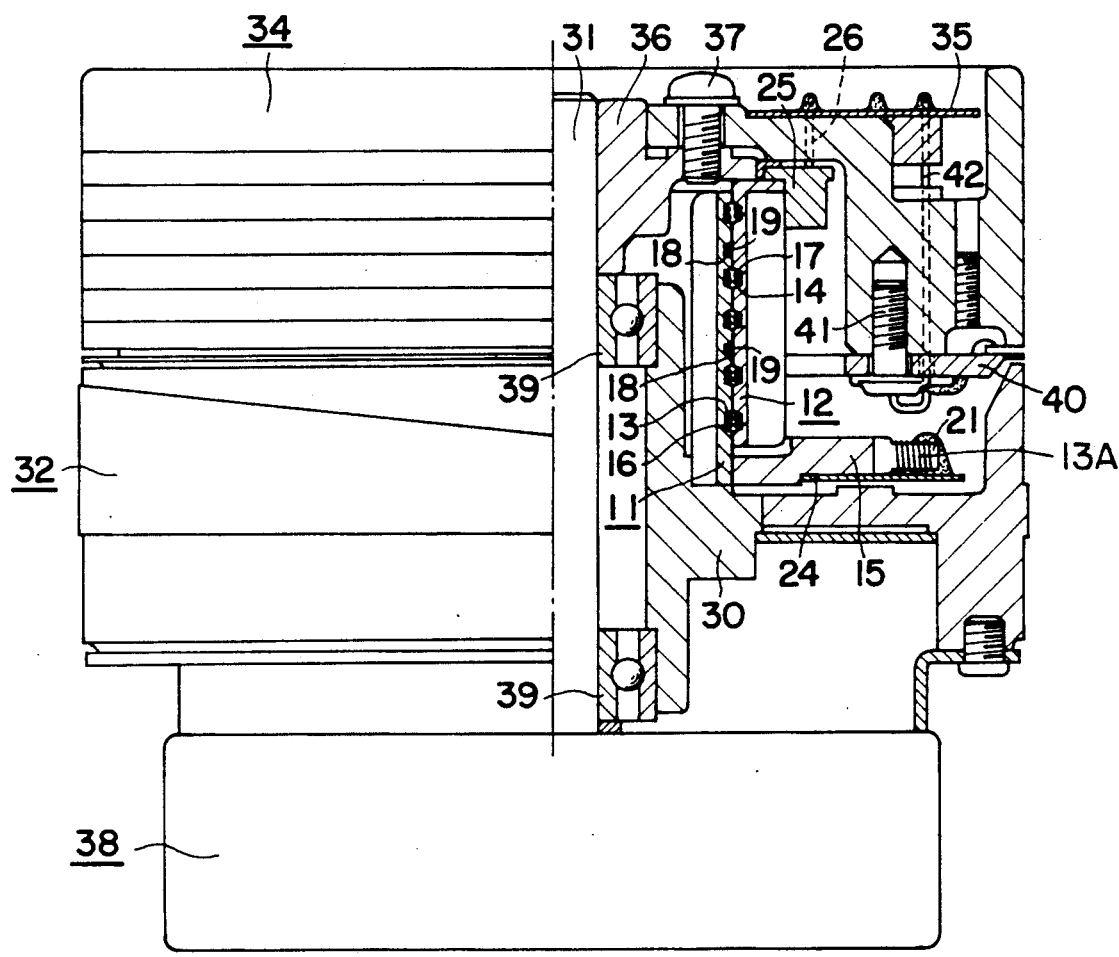
F I G. 3

5,023,734

CYLINDRICAL ROTARY TRANSDUCER

BACKGROUND OF THE INVENTION

This invention relates to a cylindrical rotary transducer used for a video camera or a video deck.

Generally, in video cameras provided with a rotary head of the helical scan type, a cylindrical rotary transducer for effecting transmission and reception of signals in a non-contact manner is used for the rotary cylinder in order to make an electrical connection between the magnetic head and the fixed cylinder (camera chassis side).

FIG. 1 indicates such a transducer for 8-channel signal transmission.

The configuration of the cylindrical rotary transducer comprises a stator core 1 sintered and molded of a high permeability material such as ferrite, etc.; a rotary core 2 fitted into a slot 1A of the stator core 1 and rotating therein so that the core 2 confronts within the inside surface of the slot 1A of the stator core 1, and sintered and molded of a high permeability material such as ferrite, etc.; and stator coils 3 and rotary coils 4 embedded into a plurality of grooves 1a and 2a annularly formed so that they are opposite to each other at the opposite surface of these cores 1 and 2.

Free coil ends (not shown) of the rotary coils 4 fitted on the rotary core 2 side are entwined or wound on pins 6 of a base plate or board 5 affixed on the upper end in FIG. 1 of the core 2, and are connected to a magnetic head (not shown) through these pins 6.

Free coil ends 3A of the stator coils 3 as shown in FIG. 2, drawn out onto a flexible printed film strip 7 affixed on the lower end of the core 1. The free coil ends 3A 3 are soldered, one by one, to land portions 8 of metal strips of a connection terminal 8A formed on the film strip 7 and are connected to respective electronic circuits on the camera chassis side through a wiring harness 7a.

In such a cylindrical rotary transducer, when a predetermined signal current from the electronic circuit on the camera chassis side is delivered to, for example, the stator coil 3 on the stator core 1 side, a magnetic flux is produced in the coil 3. As a result, a signal current corresponding to the above signal current is induced in the rotary coil 4 on the rotary core 2 side which is interlinked with the above magnetic flux. The signal current thus produced is delivered to the magnetic head. Thus, the stator side and the rotor side can be electrically connected in a non-contact manner through the cylindrical rotary transducer.

Meanwhile, in the conventional cylindrical rotary transducer, as stated above, it is necessary to draw out respective the free coil ends 3A one by one to solder them by manual work in order to connect the free coil ends 3A and the respective electronic circuits of the camera chassis. Terminal processing by such a soldering is extremely complicated or troublesome.

For this reason, it has been strongly required for such a cylindrical rotary transducer of this kind that the terminal processing applied to the coils is carried out automatically.

SUMMARY OF THE INVENTION

This invention has been made in view of the above, and an object of the invention is to provide a cylindrical rotary transducer of a novel structure capable of automatically carrying out the terminal processing of the coil.

In order to achieve the aforementioned object, a cylindrical rotary transducer according to the present invention comprises a cylindrically formed stator core of a high permeability material; a cylindrically formed rotary core disposed coaxially with the stator core and of a high permeability material; at least a stator coil and rotary coil having free coil ends and disposed respectively on the stator core and the rotary core so as to confront each other; a disk-shaped terminal member mounted on one of the stator and rotary cores, having a plurality of projections formed radially on an outer peripheral edge thereof and each of the free coil ends of the stator and rotary coils being fastened to the by wrapping thereof; and means for supporting one of the stator and rotary cores from the other in a rotatable relationship.

Since the position of the coil is mounted by applying twining or winding processing to the terminals of respective projections formed on the terminal member, automatic solding can be implemented in the terminal processing for the coils.

For this reason, in accordance with this invention, the terminal processing for the coils of the cylindrical rotary transducer is carried out automatically. Thus, a great improvement in the productivety can be made.

BRIEF DESCRIPTION OF THE DRAWINGS

In the accompanying drawings:

FIG. 3 is a side view showing, as a partial cross section, a cylindrical rotary transducer according to an embodiment of the present invention;

DETAILED DESCRIPTION OF THE PREFERRED EMBODIMENT

Figure 1:
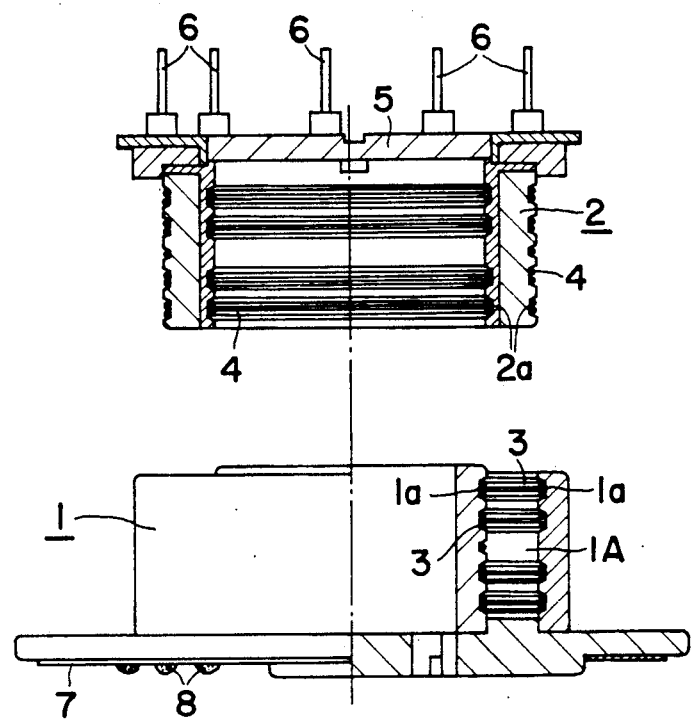
FIG. 1 is a cross sectional view showing, in a separate manner, the stator core and the rotary core of the conventional cylindrical rotary transducer.
Figure 2:
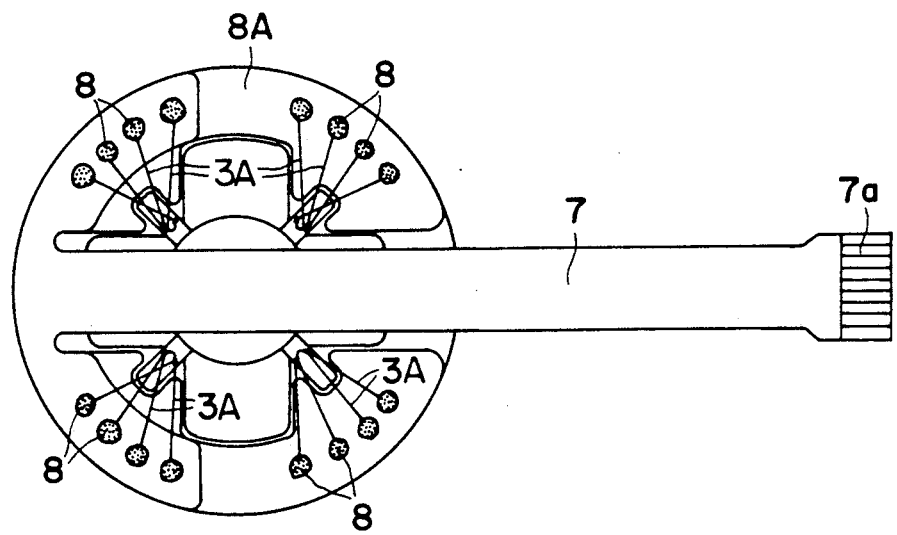
FIG. 2 is a bottom view of the conventional cylindrical rotary transducer shown in FIG. 1.

A preferred embodiment of a cylindrical rotary transducer according to the present invention will be described in detail with reference to FIGS. 3 to 5.

FIG. 3 is a side view showing an essential part of a cylinder or a drum of a video camera in which a cylindrical rotary transducer according to an embodiment is assembled.

This cylinder is provided with a cylindrical rotary transducer. The outline of the arrangement of the transducer comprises a stator core 11, a rotary core 12, stator and rotary coils 13 and 14 embedded into these cores 11 and 12, and a terminal member 15.

Figure 4:
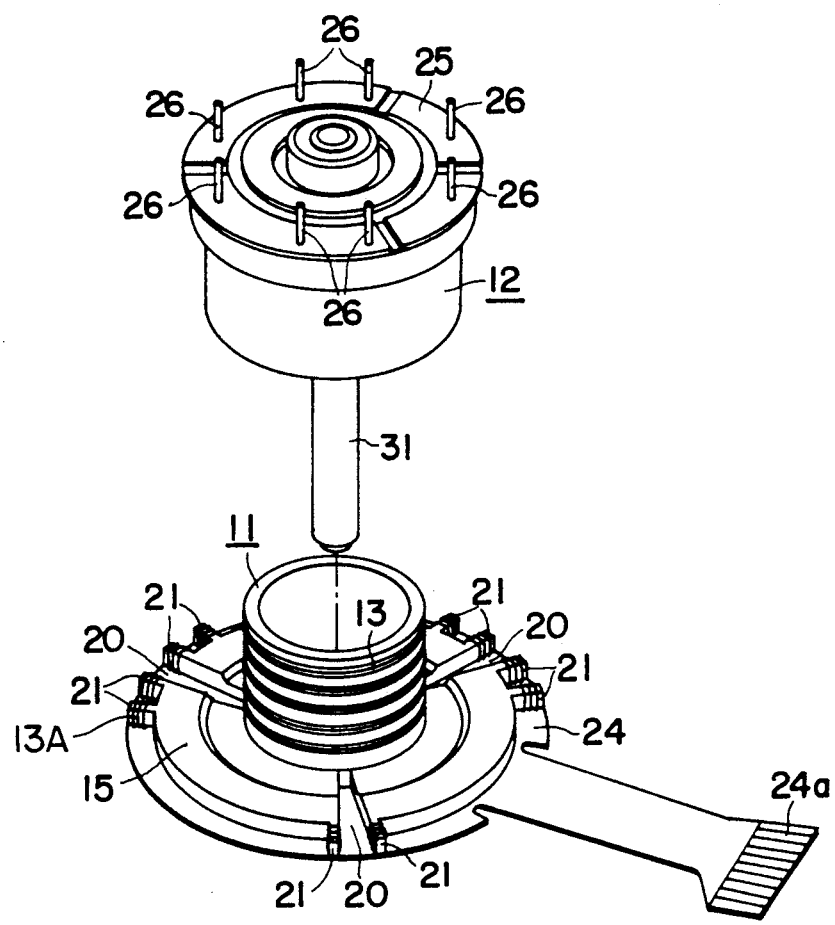
FIG. 4 is a perspective view illustrating in a separate manner, the stator core and rotary core of the transducer shown in FIG. 3.
Figure 5:
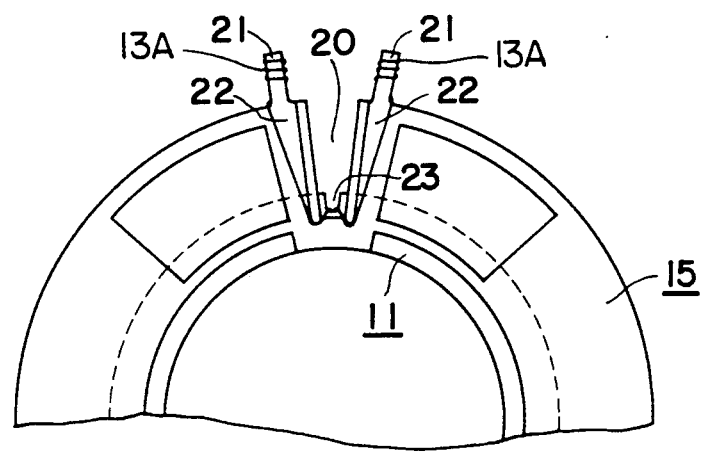
FIG. 5 is a bottom view showing the terminal member of the transducer shown in FIG. 3.

The stator core 11 is, as shown in the perspective view of FIG. 4, sintered and molded cylindrically from a high permeability material such as ferrite, etc. After sintering, a plurality of grooves 16 are annularly formed on the side of the outer peripheral surface, and the stator coils 13 are wound to be embedded into grooves 16, respectively.

The rotary core 12 is, in the same manner as the stator core 11, sintered and molded cylindrically from a high permeability such as ferrite, etc. The inner diameter of the rotary core 12 is formed so that it is larger than the outer diameter of the stator core 11. This dimensional relationship permits the stator core 11 to be fitted inside the rotary core 12. The inner peripheral surface of the rotary core 12 and the outer peripheral surface of the stator core 11 oppose each other with a predetermined spacing therebetween. A plurality of grooves 17 corresponding to the grooves 16 are formed on the side of the inner peripheral surface of the rotary core 12. The rotary coils 14 are wound and embedded into the plurality of grooves 17, respectively.

The rotary coils 14 on the rotary core 12 side are provided with a positional relationship such that they are opposite to the stator coils 13 on the stator core 11 side.

A different kind of grooves 18 are provided to each land portion between adjacent grooves 16 of the stator core 11. Short rings 19 are fitted into respective grooves 18. These short rings 19 serve to prevent magnetic interference between adjacent stator coils 13.

On the other hand, the stator core 11 is provided with a disk or doughnut-shaped terminal member 15 at the lower end in FIG. 4. The terminal member 15 is formed of a heat resistant plastic material such as a liquid crystal polymer, etc. This member 15 includes a plurality of slits 20 notched and extending in a radial direction and spaced by a predetermined angle. In the vicinity of the slits 20, a plurality of projections 21 projecting in a radial direction are integrally formed. Furthermore, as shown in FIG. 5, guide grooves 22 and pull-out guide groove 23 introducing free coil ends 13A of the stator coils 14 13 to respective projections 21 in the automatic winding process are formed on the bottom side of the member 15 at a root of the projections 21 along the respective slits 20. In accordance with such an arrangement, free coil ends 13A, are led by an automatic winding machine to the bottom side of the terminal member 15 through the grooves 22 and 23 directed in an axial direction of the stator core 11 by the automatic winding machine, then to the projections 21 through the guide grooves 22 and are finally fastened to these projections 21 by wrapping thereof.

After the free coil ends 13A are fastened to the projections 21 of the terminal member 15 by wrapping thereof, they are soldered, in this state, to the connection terminals of a flexible printed film strip 24, respectively. The free coil ends 13A are consequently connected to the electronic circuitry on the camera chassis side (not shown) through the flexible printed film strip 24. A part of the strip 24 outwardly extends to form a reed which has a wiring harness 24a at the top end thereof.

On the other hand, the free coil ends (not shown) of the rotary coils 14 are connected to a magnetic head which will be described later, through pins 26 projectedly provided on a board 25 mounted on the upper end of the rotary core 12.

The cylindrical rotary transducer of such a structure permits the automatic winding machine to perform the winding of the stator coil 13 to the stator core 11 and leading the terminating portions thereof as explained.

Turning back to FIG. 3, the arrangement of the cylindrical rotary transducer will now be described. The cylindrical stator core 11 and the terminal member 15 are mounted and fixed to a stationary cylinder 32 through a fitting member 30. In such a mounting or fixing structure, a shaft 31 as a motor shaft, the stator core 11, the terminal member 15, and the stationary cylinder 32 are coaxial. The free coil ends 13A of the stator coil 13 are connected to various electronic circuits (not shown) through the flexible printed film strip 24.

The rotary core 12, which is cylindrical, is mounted to a rotary cylinder 34 by means of the board 25 so that it is coaxial with the rotary shaft 31. The pins 26, to which the free coil ends (not shown) of the rotary coils 14 are fastened, are soldered to the respective connecting portions of the board 35 provided on the top of portion of the rotary cylinder 34.

The rotary cylinder 34 is mounted by screws 37 to a bushing 36 which is fixed to the rotary shaft 31. Accordingly, when the motor 38 is rotationally driven, the rotary cylinder 34 is rotated together with the rotary shaft 31 and the rotary core 12, etc.

The rotary shaft 31 is supported on the fitting member 30 by a bearing 39 of a ball bearing type or the like. A magnetic head 40 is mounted by screws 41 on the bottom end of the rotary cylinder 34. The front end of the magnetic head 40 protrudes toward the outer periphery of the cylinder in the gap between the rotary cylinder 34 and the stationary cylinder 32. In this embodiment, the magnetic head 40 and the board 35 are electrically connected through connection pins 42 inserted into insertion holes formed in and penetrating through the rotary cylinder 34. Each connection pin 42 has a length approximately equal to the thickness of the rotary cylinder 34, the end of which (the lower end side in the figure) is bent to form a hook. In this embodiment, after the magnetic head 40 is mounted, the hook-shaped end of each connection pin 42 inserted into the insertion hole, is soldered to the connection terminal of the magnetic head 40, and the other end of which is projected to the top surface of the board 35 and is connected to the connection terminal of the board 35. The magnetic head 40 and the rotary coil 14 are therefore connected via the board 35.

As mentioned above, in this embodiment, the connection between the rotary coil 14 and the magnetic head 40 is made through the connection pins 42, and such a connecting work is simply conducted by inserting them into the insertion holes and soldering them. Accordingly, connecting work can be carried out extremely easily and the work can be automated by machine.

In such a compact equipment as the aforementioned video camera, etc., the radial dimension of the cylinder is determined according to the industry standard, and can therefore be altered. This created a space between the stationary cylinder 32 and the rotary cylinder 34, and the space has conventionally been considered as a dead space. However, in this invention, such dead space is effectively utilized by accommodating the projections 21, thus no extra space is taken up by the projections 21.

Generally, for miniaturization of the equipment of this kind, it is demanded to make the dimension in the height direction as small as possible. In this regard, in accordance with this embodiment, the newly provided projections 21 do not increase the height of the cylindrical rotary transducer, but the height can be maintained to the conventional one.

Furthermore, the structure according to the present invention allows the extensive application of automated production processes which include reflow-soldering in which both the terminating portions of the stator coil 13 fastened to the projections 21 are automatically soldered to the flexible printed film strip 24, to bring about a great improvement in productivity.

It is to be noted that while it has been described that the projection 21 is integrally formed with the terminal member 15 in the aforementioned embodiment, this invention is not limited to the arrangement stated above. Namely, a projection member equivalent to the projections 21 may be affixed to an ordinary printed board to serve the same purpose.

In addition, while it has been described in the aforementioned embodiment that the terminal member 15 is attached only to the stator core 11 to fasten the terminating portions of the stator coil 13 thereon, this invention is not limited to such an implementation. Namely, the terminal member may be provided on either of the stator core 11 or the rotary core 12, or on both cores.

What is claimed is:

1. A cylindrical rotary transducer comprising a stator core cylindrically formed from a high permeability material, a rotary core disposed concentrically with said stator core and cylindrically formed from a high permeability material, and at least a stator coil and a rotary coil having free coil ends and disposed respectively on the stator core and the rotary core so as to confront each other, said cylindrical rotary transducer further comprising:

a disk-shaped terminal member mounted on one of the stator and rotary cores, having a plurality of projections radially formed on an outer peripheral edge thereof, and having a plurality of radially extending slits and grooves adjacent to said projections so as to guide said free coil ends to one of said stator and rotary coils through said slits and grooves to said projections each of said free coiled ends of one of said stator and rotary coils being wrapped around and fastened respectively to each of said plurality of projections; and means for rotatably supporting one of said stator and rotary cores with respect to the other of said stator and rotary cores.

2. A cylindrical rotary transducer as set forth in claim 1, wherein said disk-shaped terminal member is mounted on one end surface of said stator core.

3. A cylindrical rotary transducer as set forth in claim 2, wherein said disk-shaped terminal member is provided with a flexible printed film strip for connecting said stator coil to electronic circuitry.

4. A cylindrical rotary transducer as set forth in claim 3, wherein said free coil ends of said stator coil fastened to said projections are soldered to connection terminals of said flexible printed film strip.

5. A cylindrical rotary transducer as set forth in claim 1, wherein said rotary transducer is accommodated within a pair of stationary and rotary cylinders, a magnetic head being mounted to said rotary cylinder so as to protrude in a gap between said cylinders.

6. A cylindrical rotary transducer as set forth in claim 5, wherein said magnetic head is electrically connected to said rotor coil by means of pins penetrating through said rotary cylinder.

* * * * *